Aug. 24, 1937.                    C. W. REESE                    2,090,963
                          EGG SEPARATING APPARATUS
                   Filed Dec. 10, 1934        2 Sheets-Sheet 1
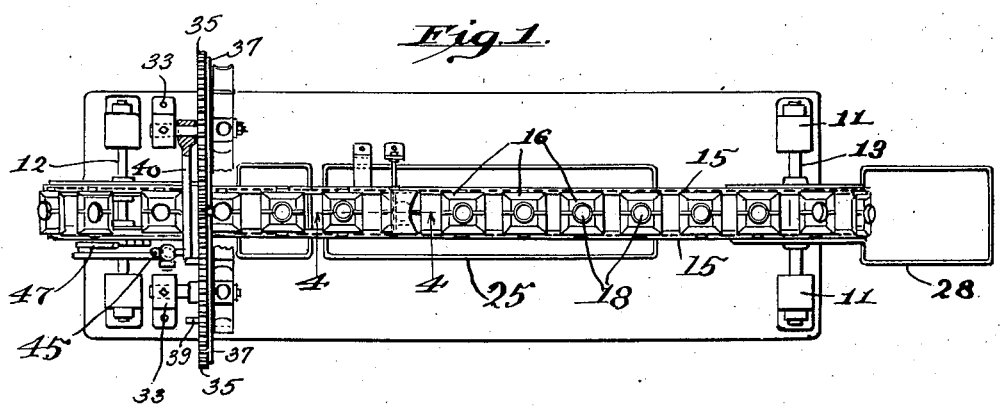
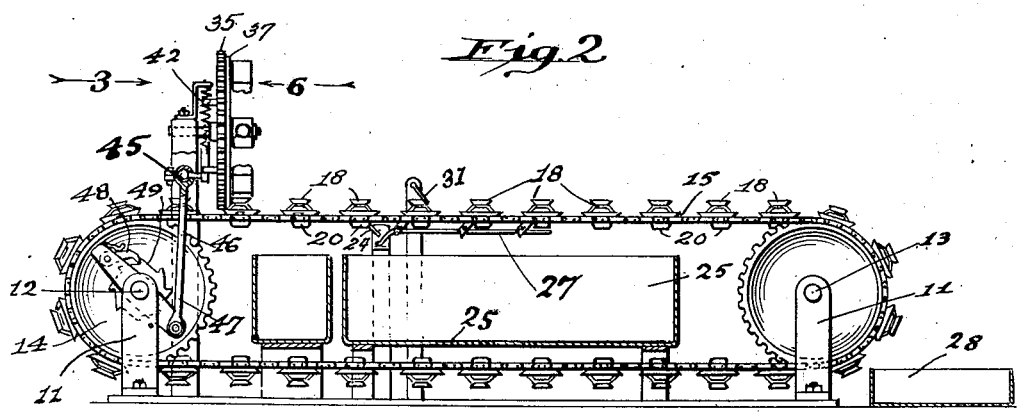
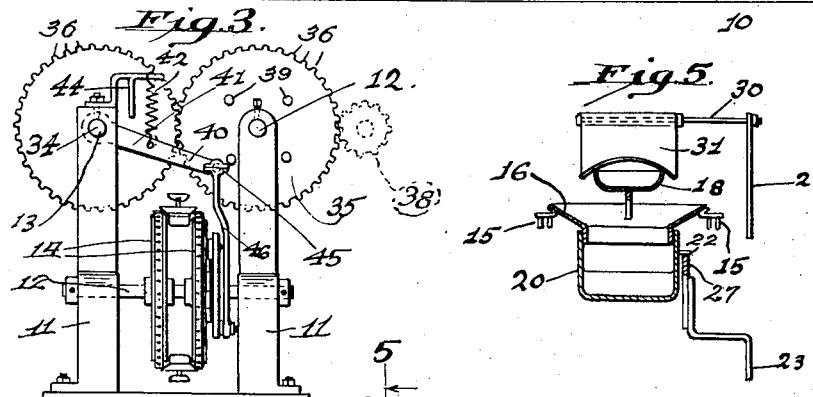
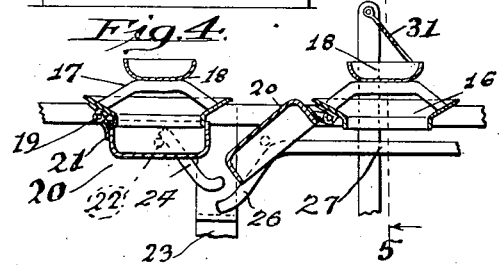
Inventor
Charles W. Reese
By Martin P. Smith
Attorney

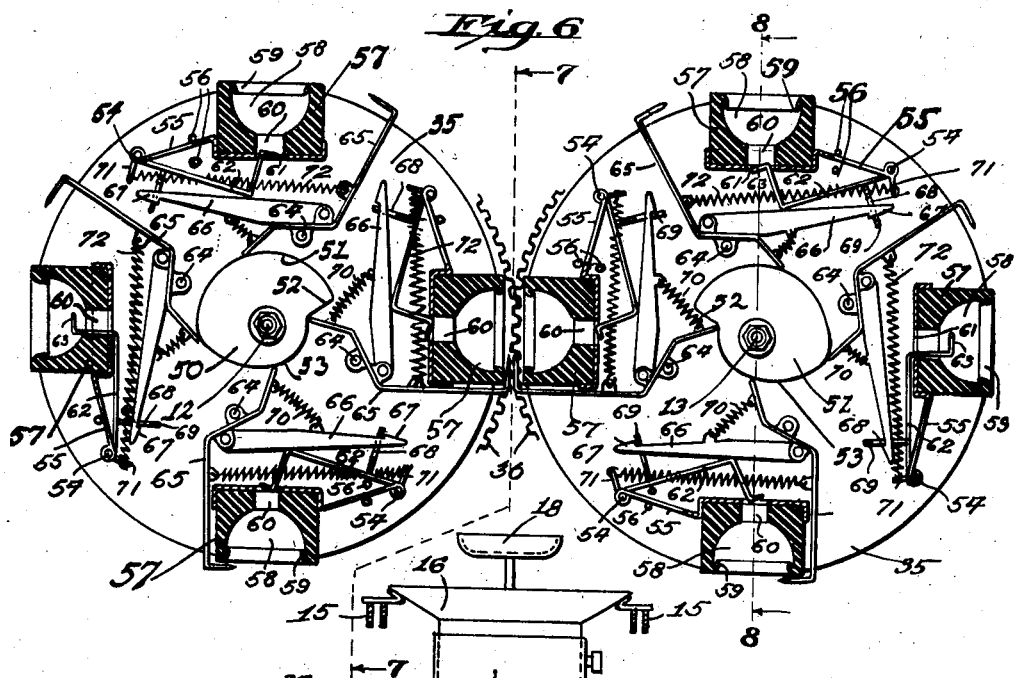

Patented Aug. 24, 1937

2,090,963

UNITED STATES PATENT OFFICE 2,090,963

EGG SEPARATING APPARATUS

Charles W. Reese, Los Angeles, Calif., assignor to Reese Patents Corporation, Los Angeles, Calif., a corporation of California Application December 10, 1934, Serial No. 756,839

14 Claims. (Cl. 146—2)

My invention relates to an egg separating apparatus and the structure herein disclosed is an improvement on the egg separating apparatus that forms the subject matter of an application for U. S. Letters Patent filed by me March 10, 1934, Serial No. 715,165.

The principal objects of my present invention are, to generally improve upon and simplify the construction of the egg separating apparatus disclosed in my aforesaid application for patent as well as to the existing forms of machines utilized for breaking eggs and separating the whites from the yolks, further, to provide an apparatus of the character referred to that may be operated continuously and at such a speed as to handle a large amount of eggs within a given period of time so as to materially reduce the cost of bringing about the separation of the whites and yolks of eggs.

A further object of my invention is, to provide an egg separating apparatus wherein a pair of simultaneously operating members driven at the same speed, carry cooperating means for receiving eggs for cutting the egg shells, for effecting a separation of the two parts of the cut shells, to permit the discharge of the contents of the eggs and for effecting a discharge of the shells from the holding means, and said machine also including an endless conveyor carrying receptacles for the reception of the whites and yolks of the eggs and with means for dumping the separated egg whites into one container and for delivering the yolks into another container.

With the foregoing and other objects in view my invention consists in certain novel features of construction and arrangements of parts that will be hereinafter more fully described and claimed and illustrated in the accompanying drawings in which:

Fig. 1 is a top plan view of an egg separating apparatus constructed in accordance with my invention.

Fig. 2 is a side elevational view of the apparatus.

Fig. 3 is an end elevational view taken looking in the direction indicated by the arrow 3 in Fig. 2.

Fig. 4 is an enlarged vertical section taken on the line 4—4 of Fig. 1.

Fig. 5 is an enlarged cross section taken on the line 5—5 of Fig. 4.

Fig. 6 is an enlarged elevational view taken looking in the direction indicated by the arrow 6 in Fig. 2.

Fig. 7 is an elevational view looking in the direction indicated by the arrow 7—7 of Fig. 6.

Fig. 8 is a vertical section taken on the line 8—8 of Fig. 6.

Referring by numerals to the accompanying drawings which illustrate a preferred embodiment of my invention, 10 designates a base provided adjacent its ends with upstanding bearings 11 and journaled in the bearings at the forward or head end of the machine, is a shaft 12 and a similar shaft 13 is journaled in the bearings in the rear end of the machine.

Carried by each shaft is a pair of sprocket wheels 14 and arranged for operation thereon is an endless conveyor that includes a pair of sprocket chains 15.

Suitably connected to the chains 15, are the upper portions of short funnel shaped members 16, the same being spaced equi-distant apart and extending across the upper portion of each member 16 is a narrow bracket 17 that provides a support for a shallow yolk receiving cup 18. The diameter of each cup is substantially less than the diameter of the funnel shaped member 16.

Connected by a hinge 19 to the underside of each member 16 is a cup 20 for receiving the white of the egg and associated with said hinge 19 is a spring 21 that normally holds the white receiving cup in closed position as illustrated at the lefthand of Fig. 4.

Projecting outwardly from the side of the cup and disposed at ninety degrees from the hinge 19, is a short pin 22.

Supported by a standard 23 that projects upwardly from the base 10 to the side of the endless conveyor, is an inclined arm 24, against which the projecting pins 22 engage as the white receiving cups 20 pass said arm and due to the inclination of this arm 22 the cups as they move past said arm, are swung downward into full open position so as to dump or discharge the egg whites into a receptacle 25 that is supported on the base 10 between the over and under running portion of the conveyor.

Supported by standard 23 at a point just below the lower end of inclined arm 22, is the lower end of an inclined arm 26, over which the pins 22 ride as the overrunning portion of the conveyor is intermittently moved and the upper end of this inclined arm 26 is connected to a short horizontally disposed arm 27 upon which the arms 22 engage for a short distance, thereby holding the white receiving cups 20 in full open position or while they are passing over the greater portion of the receptacle 25. (See Figs. 2 and 4.)

Located at the rear end of the machine, adjacent the shaft 13, is a receptacle 28 that receives the yolks of the eggs as they discharge from the cups 18 during the passage of the endless conveyor around the sprocket wheels 14 carried by said shaft 13.

Supported by a standard 29 that is positioned adjacent and slightly to the rear of standard 23, is a horizontally disposed rod 30 that projects transversely over the endless conveyor and mounted for swinging movement on said rod, is a depending plate 31 having an inwardly arched or curved lower edge 32. The yolk receiving cups 18 pass directly beneath the curved lower edge of this plate and as the same drags over the top of the cup any portion of the egg whites that otherwise tend to adhere to the yolks are scraped off and dropped into the white receiving cups 20.

Secured to and projecting upwardly from base 10, immediately to the rear of the bearings 11 that carry shaft 12, are posts 33 to the upper ends of which are secured short rearwardly projecting horizontally disposed shafts 34 that occupy positions parallel with each other and parallel with the endless conveyor.

Journaled on the projecting portions of these shafts, are large discs 35, the edges of which are provided with teeth 36 that mesh with each other so that said discs operate in unison.

Suitably secured on the rear face of each toothed disc is a slightly smaller disc 37. These simultaneously operating discs carry the egg cutting elements which will be hereinafter fully described.

A small gear wheel 38 that may be driven by a motor or belt and pulley engages the teeth of one of the discs 35 for driving the same (see Fig. 3).

Projecting from the rear face of the gear wheel that is driven by the pinion 38, is a series of pins 39 that are spaced equal distances apart and as the disc that carries said pins is rotated, said pins successively engage on top of an arm 40 that is loosely mounted on the shaft 34 that carries the opposite one of the toothed discs 35.

Secured to the intermediate portion of this arm, is the lower end of a retractile coil spring 41.

The upper end of said spring being connected to a bracket 42 that is carried by the adjacent post 33 and said bracket being provided with a stop finger 44 to limit the upward swinging movement of arm 40.

The free end of arm 40 is connected by a ball and socket joint 45 to the upper end of a depending rod 46 and the lower end of this rod is pivotally connected to one end of a ratchet arm 47 that is journaled on shaft 12.

The opposite end of this ratchet arm carries a spring pressed pawl 48, the point of which engages the teeth of a ratchet wheel 49, the latter being secured on shaft 14.

The mechanism just described provides means for imparting intermittent rotary motion to the shaft 12 and to the endless conveyor as the toothed discs 35 are continuously rotated.

The means employed for cutting the egg shells will now be described.

In this connection I have illustrated in Fig. 6 a series of four egg shell cutting devices carried by each rotating disc, but it will be understood that the number of egg cutting devices may be increased or decreased as desired.

Obviously where a large number of the egg shell cutting devices are employed, the rotating discs that support such devices must be increased in diameter.

Suitably secured to those portions of the shafts 34 that project outwardly or rearwardly from the discs 37, that function as face plates, are eccentrics 50 and each eccentric having a high portion 51, an abrupt shoulder 52 and a low portion 53 that extends from the lower end of the shoulder 52 to the end of the high portion 51 opposite the point where the same joins the outer end of said shoulder 52.

Projecting outwardly from face plate 37, adjacent the edge thereof and spaced equal distances apart, are pins 54, upon which are loosely mounted the outer ends of plates 55. The inward and outer swinging movement of each plate is limited by a pair of stop pins 56 that are seated in the face plate and arranged on opposite sides of the intermediate portion of each plate.

The inner portion of each plate carries a block 57, preferably formed of rubber, in which is formed a substantially hemi-spherical recess 58 and formed on the elastic block around the mouth of this recess is a thin inwardly presented flange 59. This flange engages the egg that is positioned in the recess 58 and exerts sufficient pressure against the egg shell to retain the same within the recess until said shell is discharged.

Formed through the elastic block 57 and leading from the bottom of the recess 58, therein to the outer surface of said block, is an opening 60 that coincides with an opening 61 that is formed in the plate 55 that carries said elastic block.

Hinged to each pin 54, is the outer end of an arm 62, the free end of which is bent at right angles as designated by 63 and this bent end is adapted to pass through the openings 60 and 61 to exert pressure on the empty egg shell and force the same out of the recess 58 and which action takes place after the yolk and white of the egg have discharged from the shell.

Seated in the face plate 37 inwardly from the blocks 57 and spaced equal distances apart, are pins 64, each of which functions as a pivot for a plate 65 having its outer end bent at right angles and the end of the bent portion is sharpened so as to form an egg shell cutting blade inasmuch as said blade passes between a pair of the blocks 57 that hold an egg at a certain point in the rotation of the toothed discs 35.

The inner end of each plate 65 rides on the periphery of the eccentric 50.

Pivotally connected to each plate 65 a short distance outwardly from the pivot point 64 thereof, is a finger 66, the outer end of which terminates in a hook 67. This hook passes through a slot 68 that is formed in a short plate 69, the latter projecting downwardly from the egg shell ejection plate 62 at a point inset from its pivot.

The length of slot 68 is such that the hook 67 may work or move freely through and lengthwise of said slot.

Connecting the intermediate portion of each finger 66 with the adjacent end of the egg shell cutting plate 65, is a light retractile spring 70.

Projecting substantially at right angles from the end of plate 55 that is mounted on pin 54, is a short arm 71 and connecting the outer end of this arm and the intermediate portion of the shell cutting plate 65 between its pivot and the blade 66, is a retractile spring 72.

In the operation of my improved egg separating machine, the motor or belt driven pinion 38 imparts rotary movement to the toothed disc 35 with which it is in engagement and this rotary movement is transmitted to the other one of the toothed discs 35.

As the pins 39 engage the free end of arm 40, the latter is swung downward and through rod 46 and the ratchet and pawl arrangement between the lower end of said rod and shaft 12, the latter is intermittently rotated and corresponding intermittent movement is imparted to the endless conveyor that operates on the pairs of sprocket wheels 14.

After each pin passes off the free end of arm 40, the latter is elongated by the pull exerted by retractile spring 41 and the upward movement of arm 40 is limited by stop finger 44.

An operator located at the side of the machine places an egg in the recess 58 in one of the uppermost blocks 57 and as the notched discs 35 are intermittently rotated toward each other, the projecting end of the egg will, as the blocks approach each other, enter the recess in the block carried by the opposite disc.

Each egg receiving block has a certain amount of inward and outward movement, which movement is limited by the stop pins 56 and thus the blocks are self-adjusting for the accommodation of eggs that vary slightly in length.

The inserted egg is firmly retained in position within the recesses in the blocks by the elastic lips of flanges 59.

When the egg receiving blocks are at the highest points on their travel and in position to receive the eggs, the various arms and plates associated with each block occupy the positions as illustrated by the uppermost blocks in Fig. 6 and at such time the lower or inner ends of the uppermost pair of cutting plates 65 are riding upon the high portions 51 of the cams 50.

When the pair of blocks that hold an uncut egg reach a position immediately adjacent each other or in the same horizontal plane with the axes of the notched discs, the inner ends of the corresponding plates 65 ride off the abrupt shoulders 52 of the eccentrics and under the influence of the retractile springs 72, said plates are swung on their axes so that the blades 66 on the outer ends of said plates will move rapidly into the lower portion of the space between the pair of blocks that hold the egg and the blade 66 will cut through the lower portion of the shell of the egg that is positioned within and between the blocks.

On the succeeding intermittent movement of the notched discs, the pair of blocks that hold the egg, the shell of which has just been cut, will move apart as they reach their lowermost limit of travel and the pressure of the blade 66 on the cut edges of the shell will break the upper portion of the shell on a medial line so that the contents of the egg will discharge from the separated shell.

The yolk of the egg will drop into the shallow receptacle 18 and practically fill the same and the egg white overflowing from the receptacle 18, will pass downward through the funnel-shaped member 16 and discharge therefrom into container 20.

As the egg cutting plates 65 swing on their axes as just described so as to effect the cutting movement of the egg shell, the arms 66 will be moved a short distance lengthwise, due to the position of their axes with respect to the axes 64 so that the hooks 67 on the ends of said arms 66 will move through the slots in plates 69 and said hooks will engage said plates below the notches therein as a result of the pull exerted by the springs 70.

The parts just described will retain such positions while the blocks 57 are moving through their lowermost paths of travel and as said blocks start to move upward from the lowermost points in their travel, the inner ends of plates 65 will ride up the low portions 53 of the eccentrics which gradually meet the high portions 51 so that the said plates 65 are gradually swung on their axes until the blades on the outer ends of said plates leave the blocks 65 and this movement imparts a short longitudinal movement to the arms 66.

Inasmuch as the hooks 67 on the ends of the said arms are in engagement with the plates 69 below the slots 68 pull will be exerted on said plates by the longitudinally moving arms so as to swing the free ends of plates 62 inwardly toward the blocks 57 and the laterally bent ends 63 of said plates 62 will be moved through the openings 61 and 60 to eject the egg shells that occupy the recesses 58 in blocks 57.

As the various plates and arms approach their upward limit of travel, they will automatically resume their normal positions as a result of the travel of the inner ends of plates 65 on the high portions 51 of the eccentrics and as a result of the pull exerted by springs 70 and 72.

If a decayed or "musty" egg is delivered to the egg receiving cups and subsequently cut by the blades 66, the odor arising from said egg when the same is cut is immediately noticeable by the attendant positioned at the side of the machine adjacent the discs 35 and parts carried thereby and as soon as the contents of the spoiled or "musty" egg has passed into the receptacles 18 and 22, they may be removed by the attendant and thrown into a suitably located waste receptacle.

The attendant removes the yolk from the receptacle 18 by using a spoon or the like and the receptacle 20 is dumped manually by engaging the pin 22 and thus the contents of a spoiled or "musty" egg are not carried into position for delivery into the respective receptacles for the egg whites and yolks.

Further, as the containers for the yolks and whites move from the point where they receive the egg yolks and white to the point where the receptacle 20 is automatically dumped, the attendant may notice and remove any blood spots that appear on the yolks or whites.

As the receptacles for the egg yolks and whites approach the inclined rail 24, the pin 22 on the side of the receptacle 20, will engage their travel downward on said inclined rail, thereby swinging the receptacle downwardly to effect the discharge of the egg whites into container 25 and as the pin 22 rides over rail 27, the container is held in a substantially upsidedown position so as to permit all of the whites to drain from the receptacle.

As the yolk receptacles 18 pass beneath the plate 31, the latter functions as a scraper to remove any whites that may adhere to the yolks and at this time the receptacles 20 are swung entirely away from the lower ends of the funnel members 16 so that those portions of the whites that are scraped from the yolks will pass into receptacle 25.

As the receptacles 18 and 20 pass downwardly around the sprocket wheels 14 carried by shaft 13, the yolks will discharge from the receptacles 18 into the container 28.

My improved egg separating machine may be operated at a speed so as to automatically handle a large number of eggs within a given period of time and after the cutting of the eggs and the subsequent separation of the whites and the yolks is effected entirely by mechanical means, there is no possibility of contamination of the separated whites and yolks as a result of contact with the soiled hands of operators or attendants so that the machine meets all sanitation requirements.

Thus it will be seen that I have provided a relatively simple, practical and inexpensive machine that may be conveniently and economically employed for the automatic and comparatively rapid separation of the whites and yolks of eggs.

It will be understood that minor changes in the size, form and construction of the various parts of my improved egg separating apparatus may be made and substituted for those herein shown and described without departing from the spirit of my invention, the scope of which is set forth in the appended claims.

I claim as my invention:

1. In an egg separating machine, a pair of discs mounted for rotation, means for simultaneously rotating said discs, cooperating egg receiving members carried by said discs, means pivotally mounted adjacent each egg-receiving member and carried by said discs for cutting the shells of the eggs positioned in said cooperating members and fixed means arranged between the egg carrying members for controlling the operation of said egg shell cutting means.

2. In an egg separating machine, a pair of discs mounted for rotation, means for simultaneously rotating said discs, cooperating egg receiving members carried by said discs, means pivotally mounted adjacent each egg-receiving member and carried by said discs for cutting the shells of the eggs positioned in said cooperating members, fixed means arranged between the egg carrying members for controlling the operation of said egg shell cutting means and means for ejecting the shells of the eggs after the same have been cut.

3. In an egg separating machine, a pair of discs mounted for rotation, means for simultaneously rotating said discs, cooperating egg receiving members carried by said discs, means pivotally mounted adjacent each egg-receiving member and carried by said discs for cutting the shells of the eggs positioned in said cooperating members, fixed means arranged between the egg carrying members for controlling the operation of said egg shell cutting means, means for ejecting the shells of the eggs after the same have been cut and means located below said discs for receiving the yolks and whites of the eggs as the same discharge from the cut shells.

4. In an egg separating machine, a pair of discs mounted for rotation, means for simultaneously rotating said discs, cooperating egg receiving members carried by said discs, means pivotally mounted adjacent each egg-receiving member and carried by said discs for cutting the shells of the eggs positioned in said cooperating members, fixed means arranged between the egg carrying members for controlling the operation of said egg shell cutting means, means located below said discs for receiving the yolks and whites of the eggs as the same discharge from the cut shells and means mounted on said discs and controlled by the operation of said egg shell cutting means for ejecting the shells of the eggs after the same have been cut.

5. In an egg separating machine, a pair of discs mounted for rotation, means for imparting simultaneous rotary movement to said discs, a plate pivotally mounted on each disc, a recessed egg receiving member carried by each plate, said member being provided with an opening that communicates with the bottom of the recess in said member, means carried by each disc for cutting the shell of the egg positioned in said recessed member and means carried by each disc and arranged to move through the opening in said egg receiving member to eject the shell from said recess.

6. In an egg separating machine, a pair of discs mounted for rotation, means for imparting simultaneous rotary movement to said discs, a plurality of recessed egg receiving members carried by each disc, means pivotally mounted on the discs for cutting the shells of the eggs held in the egg receiving members and means including fixed eccentrics positioned adjacent to said discs and in contacting relation with the egg shell cutting means and retractile springs connected to the egg shell cutting means for actuating said egg shell cutting means to swing the cutting edges thereof into position between the egg receiving members when the same are positioned adjacent each other.

7. In an egg separating machine, a pair of discs mounted for rotation, means for imparting simultaneous rotary movement to said discs, a plurality of recessed egg receiving members carried by each disc, means pivotally mounted on the discs for cutting the shells of the eggs held in the egg receiving members, means including fixed eccentrics positioned adjacent to said discs and in contacting relation with the egg shell cutting means and retractile springs connected to the egg shell cutting means for actuating said egg shell cutting means to swing the cutting edges thereof into position between the egg receiving members when the same are positioned adjacent each other and means for automatically ejecting the shells of the eggs from the egg holding members after said shells have been cut.

8. In an egg separating machine, the combination with an endless conveyor of a series of funnel shaped members carried by said conveyor, an egg yolk receptacle supported above each funnel shaped member the diameter of which egg yolk receptacle is less than the diameter of said funnel shaped member and an egg white receptacle hinged to and positioned beneath said funnel shaped member.

9. In an egg separating machine, the combination with an endless conveyor of a series of funnel shaped members carried by said conveyor, an egg yolk receptacle supported above each funnel shaped member the diameter of which egg yolk receptacle is less than the diameter of said funnel shaped member, an egg white receptacle hinged to and positioned beneath said funnel shaped member and fixed means for swinging the egg white container upon its hinge at a predetermined point in the travel of the conveyor.

10. In an egg separating machine, an endless conveyor, a series of funnel shaped members carried by said conveyor, an egg yolk receptacle supported above each funnel shaped member, an egg white receptacle hinged to and positioned beneath said funnel shaped member, fixed means for swinging the egg white container upon its hinge at a predetermined point in the travel of the conveyor and means arranged above the conveyor for scraping across the top of the egg yolk containers as the latter are carried forward beneath said scraping means.

11. In an egg separating machine, the combination with an endless conveyor, of a plurality of funnel shaped members mounted on said endless conveyor, a yolk receptacle supported by and above said funnel shaped member, the diameter of which yolk receptacle is smaller in diameter than said funnel shaped member, an egg white receptacle arranged beneath said funnel shaped member, a spring hinge connecting said funnel shaped member and said egg white receptacle and a member positioned above the endless carrier for scraping across the top of the yolk receptacle to remove any portion of the egg whites that may adhere thereto.

12. In an egg separating machine, the combination with an endless conveyor, of a plurality of funnel shaped members mounted on said endless conveyor, a yolk receptacle supported by and above said funnel shaped member, the diameter of which yolk receptacle is smaller in diameter than said funnel shaped member, an egg white receptacle arranged beneath said funnel shaped member, a spring hinge connecting said funnel shaped member and said egg white receptacle and fixed means for automatically swinging said egg white receptacle downwardly and outwardly at a predetermined point in the travel of the endless conveyor.

13. In an egg separating machine, a pair of discs mounted for rotation, means for imparting simultaneous rotary movement to said discs, cooperating egg receiving members carried by the faces of said discs, plates pivotally mounted on said discs adjacent said egg receiving and holding means, blades projecting at right angles from the outer ends of said plates, which blades are adapted to pass between the egg receiving and holding means to cut the shells of the eggs held therein and fixed means for swinging said blade carrying plates on their axes at a predetermined point in the rotation of said discs.

14. In an egg separating machine, a pair of discs mounted for rotation, means for imparting simultaneous rotary movement to said discs, cooperating egg receiving members carried by the faces of said discs, plates pivotally mounted on said discs adjacent said egg receiving and holding means, blades projecting at right angles from the outer ends of said plates, which blades are adapted to pass between the egg receiving and holding means to cut the shells of the eggs held therein, fixed means for swinging said blade carrying plates on their axes at a predetermined point in the rotation of said discs and means mounted on said discs for automatically ejecting the shells of the eggs from the receiving and holding means after said shells have been cut.

CHARLES WM. REESE.